United States Patent

[11] 3,601,689

[72] Inventor Clarence J. Kettler
 Lenox, Mass.
[21] Appl. No. 869,174
[22] Filed Oct. 24, 1969
[45] Patented Aug. 24, 1971
[73] Assignee General Electric Company

[54] THERMAL LOAD INDICATOR FOR ELECTRICAL APPARATUS
 8 Claims, 6 Drawing Figs.
[52] U.S. Cl. ................................................ 323/43.5 S,
 340/417
[51] Int. Cl. ................................................ G05f 1/20
[50] Field of Search ........................................ 323/43.5,
 68, 74, 81; 340/228, 417

[56] References Cited
UNITED STATES PATENTS
2,557,224  6/1951  Hornfeck ...................... 340/417 X
2,642,149  6/1953  Backer et al. ................. 323/43.5 X
2,675,092  4/1954  Hall ............................. 323/43.5 UX
3,054,943  9/1962  Kettler et al. ................ 323/43.5 X Primary Examiner—J. D. Miller
Assistant Examiner—A. D. Pellinen
Attorneys—Francis X. Doyle, Vale P. Myles, Frank L. Neuhauser, Oscar B. Waddell and Joseph B. Forman ABSTRACT: A thermal load indicator to show the present thermal loading of an electrical apparatus and the past maximum thermal loading. A thermal model comprising a nonlinear, temperature sensitive, resistor and a heater resistor in a thermal container is immersed in the insulation liquid of the electrical apparatus to provide a representation of the "hot spot" temperature of such apparatus. The thermal model is placed electrically in a voltage divider to provide an error signal to a servomotor circuit. The servomotor drives an indicator device to provide an indication of thermal loading. The indicator in turn is coupled to a rheostat which is driven to balance the voltage divider eliminating the error signal. A drag hand on the indicator indicates the maximum past thermal loading. Switching means are provided in the indicator device when used with a tap changing apparatus to drive such apparatus to a lower ratio when such apparatus is overheated.

Inventor,
Clarence J. Kettler,
by Francis X. Doyle
His Attorney.

3,601,689

THERMAL LOAD INDICATOR FOR ELECTRICAL APPARATUS

BACKGROUND OF THE INVENTION

This invention relates to a thermal load indicator for electrical apparatus and more particularly to a thermal load indicator especially useful in tap changing type of electrical apparatus.

In the use of various types of electrical apparatus the electrical utilities desire to know how loaded is such apparatus. This information is desired to determine the necessity of changing out such electrical apparatus to one of higher capacity to serve increasing loads. In many instance, utilities rely on maximum current indicators or maximum current meters to provide such information. While these devices are very useful for this purpose, they do not provide an accurate indication of the heat buildup within the electrical apparatus. This is often considered more desirable as a more accurate indicator of load conditions of the apparatus than is the maximum current showing. Also, as is well known, the "hot spot" temperature of an electrical apparatus may indicate a need to change out the apparatus even though the maximum current is still within the design limits of such apparatus.

Further, in the use of tap-type electrical apparatus such as transformers and regulators, it is possible to run back the tap position in the event of high thermal loading. Running back to a lower tap position can increase the current capacity of the electrical apparatus while at the same time allowing it to operate at lower temperatures. It has been found desirable to provide an automatic run back feature in thermal load indicators so that the apparatus will automatically return to a lower setting in the event the apparatus reaches a predetermined thermal loading.

It is, therefore, one object of this invention to provide a novel, low cost, self-contained thermal load indicator for electrical apparatus.

It is a further object of this invention to provide a novel thermal load indicator which will indicate the thermal loading of a variable turns ratio electrical apparatus.

A still further object of this invention is to provide a novel, thermal load indicator which does not require probes into or alterations of a coil structure of the electrical apparatus.

Yet another object of this invention is to provide a novel, thermal load indicator which provides an automatic run back feature to provide a lower setting of the apparatus in the event of thermal overloading.

SUMMARY OF THE INVENTION

In a preferred form, the thermal load indicator of this invention comprises a thermal model of the electrical apparatus which includes a nonlinear resistor and a heater resistor in a thermal container. The thermal model is immersed in the insulating liquid of the apparatus providing a representation of the hot spot temperature of such apparatus. The thermal model in a voltage divided network provides an error signal which operates a servomotor to drive an indicator to the appropriate indication of thermal loading. A rheostat in the voltage divider is also driven to balance the divider and eliminate the error signal.

Switching means are provided actuated by the indicator device to drive the electrical apparatus to a position of higher current capacity in the event of a predetermined thermal load.

The invention sought to be protected will be particularly pointed out and distinctly claimed in the claims appended hereto. However, it is believed that this invention and the manner in which its various objects and advantages are obtained, as well as other objects and advantages thereof, may be better understood by reference to the following detailed description of a preferred embodiment, particularly when considered in the light of the accompanying drawings.

DESCRIPTION OF PREFERRED EMBODIMENT

For a more complete understanding of the various features of the novel thermal load indicator of this invention, reference will now be made to the drawings in which like numerals are used to indicate like parts throughout the various views.

Figure 1:
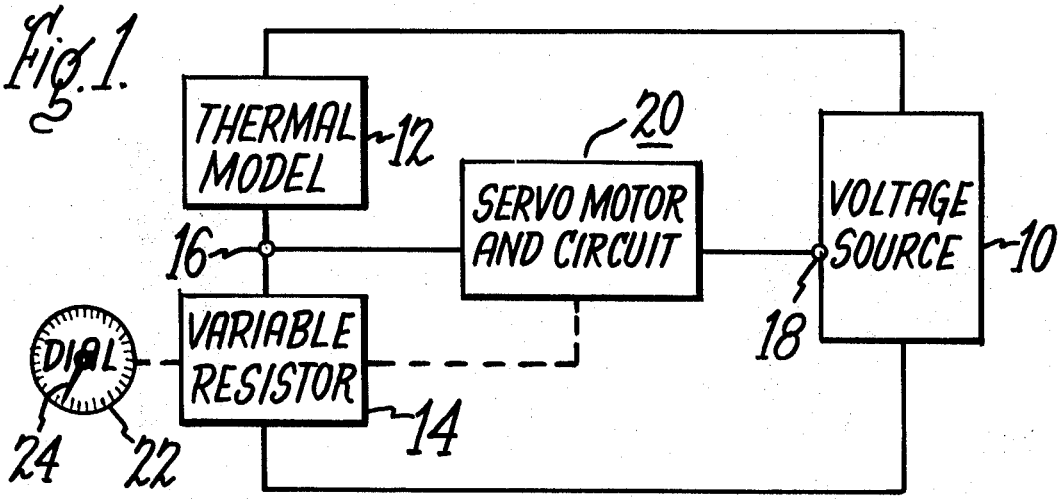
FIG. 1 is a block diagram of the basic elements of a preferred form of thermal load indicator according to this invention.

Referring first to FIG. 1, there is shown a block diagram of the basic components of the preferred form of thermal load indicator of this invention. As shown in FIG. 1, a source of electrical energy 10, for example, the center tapped secondary of a transformer, provides a voltage across a voltage divider network which comprises a thermal model 12, having a nonlinear temperature sensitive resistor, and a variable resistor 14. As will be understood, thermal model 12 is immersed in the insulating liquid of the electrical apparatus (not shown) whose thermal load is to be indicated. As the resistance of thermal model 12 varies according to thermal load, an error signal is developed between junction 16 and center tap 18 of transformer winding 10. This error signal actuates a reversible servomotor 20 which adjusts variable resistor 14 to rebalance the voltage divider and eliminate the error signal. The variable resistor 14 is directly coupled to indicator 22 and drives pointer 24 of indicator 22 to an indication of the thermal load of the electrical apparatus.

Figure 2:
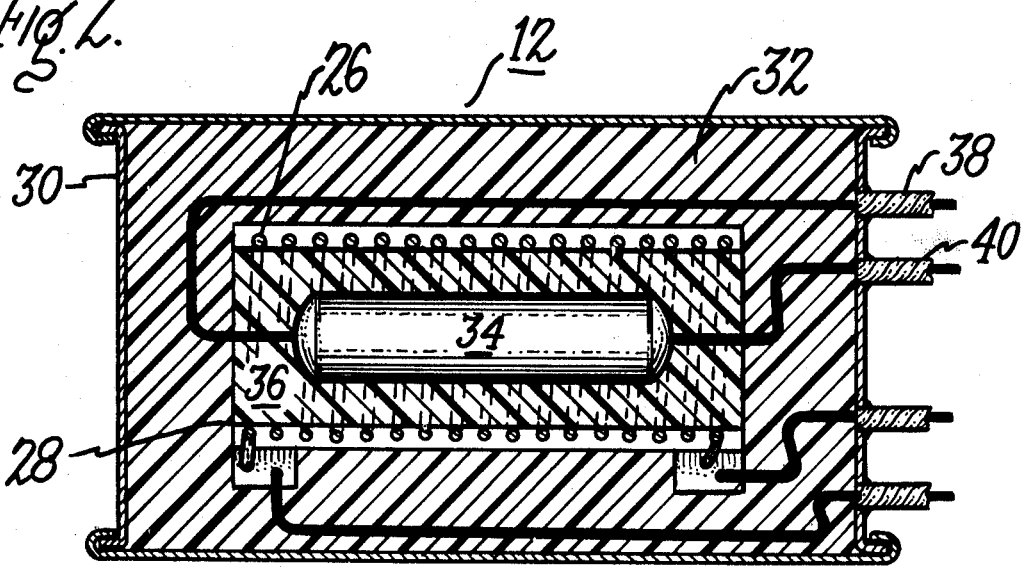
FIG. 2 is a cross-sectional plan view of a preferred form of thermal model according to this invention.

One preferred form of thermal model is shown in FIG. 2 to which reference will now be made. FIG. 2 shows thermal model 12 which includes a nonlinear, temperature sensitive resistor 26 which is wound on tubular form 28. As will be understood, the resistance value of resistor 26 is a measure of its average temperature. In the preferred form, the resistor 26 is wound on form 28 to provide a resistance of approximately 1200 ohms at 25° C. and 1840 ohms at 140°C. Resistor 26 is enclosed in a container 30, the container 30 being filled with a thermal barrier material 32. Since the thermal model 12 is to be immersed in the insulation liquid of the electrical apparatus (not shown), it is desirable to provide a time constant for temperature change by means of a thermal barrier or filler 32. In the preferred form, this time constant is approximately 45 minutes.

A heater resistor 34 is mounted in the center of form 28 and radiates heat outward to nonlinear resistor 26. A thermal barrier material 36 is placed in form 28 about heater resistor 34. This thermal barrier is designed to yield a short time constant, such as 10 minutes, to represent the thermal behavior of a coil structure. Of course, it will be apparent that for heater resistor 34 to have an appreciable affect on the nonlinear resistor 26, outer thermal barrier 32 is necessary. As will be understood, current leads 38, 40 from heater resistor 34 will be connected either directly to the electrical apparatus (not shown) or to the secondary of a current transformer (not shown) in the electrical apparatus to provide an actual or a facsimile of the current flowing in such electrical apparatus.

Of course, it will be clear to those skilled in this art that thermal barrier 32 enables the heater resistor 34 to be kept small so as to add a minimum burden on the current transformer of the electrical apparatus. As will also be clear, the first thermal barrier 32 will introduce a negligible temperature error in the model due to the much longer time constant inherent in the volume of insulating fluid in the electrical apparatus.

The thermal barriers 32 and 36 may be of any desired type to provide the necessary time constants. A preferred form of barrier is a thermosetting plastic material such as a polyester or epoxy resin having an admixture of micron sized hollow glass spheres. The longer the time constant desired the more hollow glass spheres there will be in the barrier material.

Figure 3:
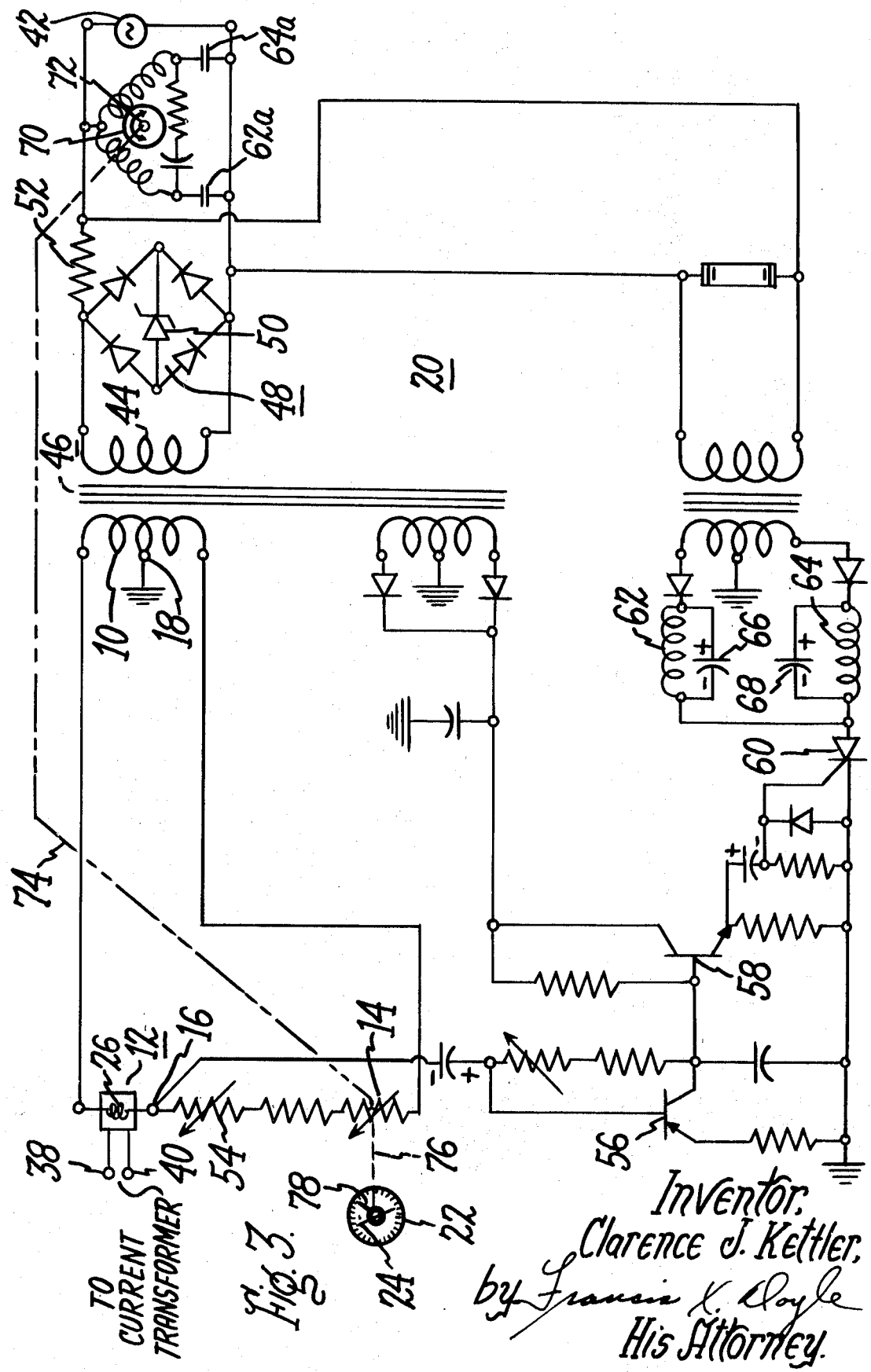
FIG. 3 is a schematic diagram of the servomotor drive and balancing circuit according to a preferred form of this invention.

FIG. 3 is a schematic diagram of the present preferred embodiment of the servomotor and balance circuit. As can be seen from FIG. 3, a source of electrical energy 42 is applied to one winding 44 of transformer 46. A diode bridge 48 with a Zener diode 50, combined with the resistor 52, provide essentially a square wave excitation of the transformer 46. This square wave excitation is utilized in the switching circuit as will appear hereafter. Connected across the other winding 10 of transformer 46 is a voltage divider network including thermal model 12 with its nonlinear temperature sensor temperature sensor resistor 26 in the divider network and the variable resistor 14. As will be understood, the voltage divider may include a second variable resistor 54 to provide appropriate balancing of the voltage divider prior to installation of the device. When the sensor resistor 26 changes resistance due to temperature changes, the voltage divider will become unbalanced and an error signal will appear between junction 16 and the center tap 18 of winding 10. The error signal is applied to the base of transistor 56 causing it to conduct on alternate half cycles of the square wave and with instantaneous polarity as determined by the direction of the temperature error. Transistor 58 is connected as an emitter follower and serves for impedance matching to the gate of the silicon controlled rectifier 60. When the error signal causes conduction of transistor 56, the error signal is impressed on the gate of the silicon controlled rectifier 60 causing it to conduct and thereby energizing one of the relays 62 or 64, depending on the polarity of the error signal. Capacitors 66 and 68 are placed across relays 62, 64 as shown, to insure sealing in of the relay by maintaining the coil current. The motor 70 is energized from source 42 to turn in a direction depending upon the energized relay. As can be seen, relay switch 62a or 64a will be closed according to which relay 62 or 64 has been energized. Motor 70 is a low wattage reversible clock-type motor. The motor shaft 72 is connected to rheostat 14 as shown by the dotted line 74. As the motor 70 rotates it moves rheostat 14 in a direction to remove the error signal from the voltage divider network. As rheostat 14 is moved, a direct connection 76 to dial 22 will rotate the indicator hand 24 to indicate the thermal load on the electric apparatus (not shown). Also shown on dial 22 is a drag hand 78. As will be understood, drag hand 78 is pushed upscale by hand 24 and will remain at the highest thermal load indication even though hand 24 is returned to a lower thermal load indication.

As earlier indicated, in case of a regulator or similar type tap transformer, it is possible to run the tap switch to a lower setting which will increase the current capacity without increased thermal heating. This invention provides a novel automatic feature to provide for run back to a lower setting whenever the thermal load indicator reaches a preset temperature, in the preferred embodiment such preset temperature being 105°C.

Figure 4:
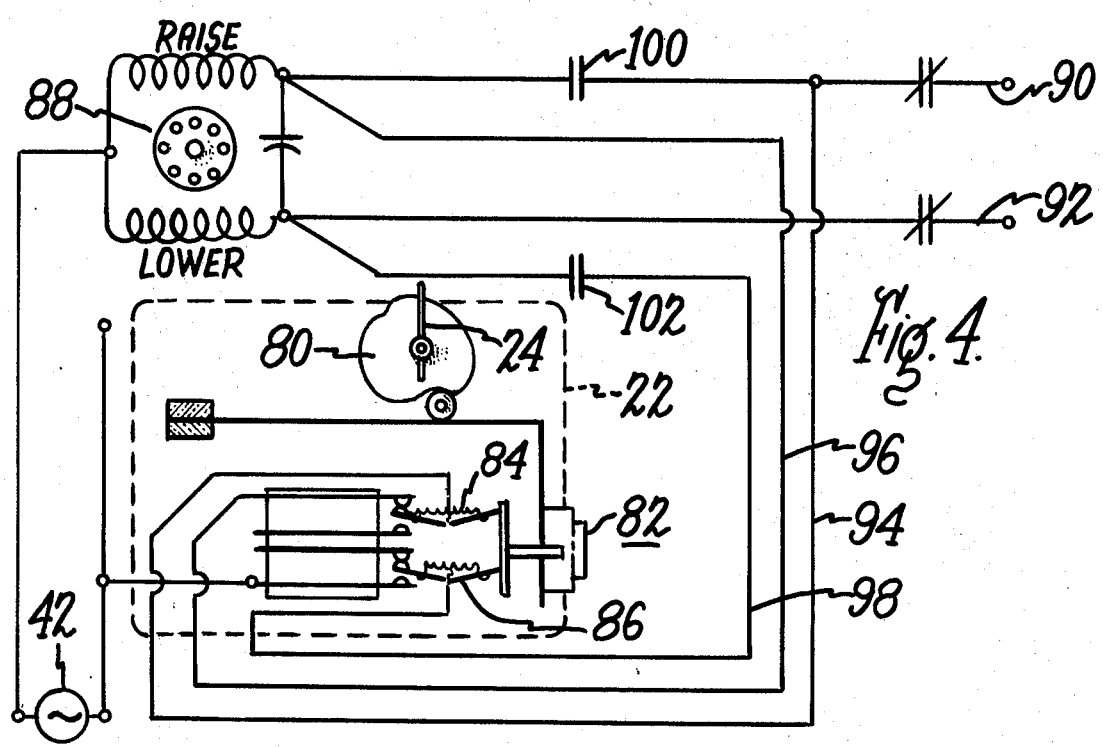
FIG. 4 is a schematic diagram of the run back circuit according to a preferred embodiment of this invention.
Figure 5:
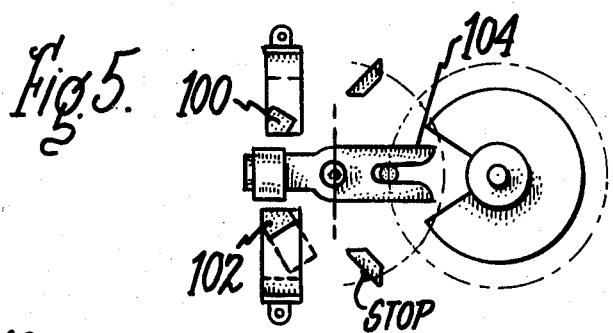
FIG. 5 is a plan view of a preferred form of run back switch for use in the circuit of FIG. 4.

FIGS. 4 and 5 show the novel automatic run back control circuit of this invention. As shown in FIG. 4, dial 22, indicated in dotted lines, has a cam 80 mounted on the same shaft as pointer or hand 24. Cam 80 operates a two-pole switch 82 having a normally closed switch pole 84 and a normally open switch pole 86. Whenever dial pointer 24 reaches 105° C. on the dial 22, cam 80 actuates switch 82 to close pole 86 and open pole 84.

The raise and lower motor 88 of the regulator is connected to the motor circuit (not the motor circuit (not shown) over lines 90 and 92. The motor 88 is also connected to switch 82 over lines 94, 96 for the raise position and line 98 for the lower position. As can be seen when pole 84 is closed, line 90 bypasses switch contact 100 over line 94, pole 84 and line 96. When pole 86 is closed, line 98 provides energy to the motor to lower the regulator position through switch contact 102 in line 98. Obviously if the regulator is already in a lower position no benefit is served in running back on overload. Contacts 100 and 102 serve to allow run back only when the regulator is in advanced or raised position. This switch is best shown in FIG. 5.

As will be understood, step regulators are essentially autotransformers with the output or load lead connected to the taps on a series winding which results in a variable voltage ratio between the input and output connections. At full buck or boost position such as tap 16 (see FIG. 6) the full series winding is in use. However, at tap position 8 only one-half the series winding is carrying current. Further, the turns ratio is closer to unity so that the load component of current in the primary is reduced by half. This allows the regulator to handle more current without overheating. In recognition of this, switch 104 of FIG. 5 is provided with the contacts 100 and 102. Switch 104 is operated by the tap changing device such that it is in the neutral position shown in FIG. 5, at tap position 8. At tap positions below 8 switch 104 is moved to close switch contact 100. At tap positions above 8 switch 104 is moved to close switch contact 102.

Referring again to FIG. 4, it can be seen that when the regulator is above tap position 8 that switch contact 102 will be closed. Therefore, when dial pointer 24 reaches 105° C., the preset thermal indication, the switch pole 86 will be closed and will energize motor 88 through line 98 and switch contacts 102 to drive the regulator back to tap position 8. At tap position 8 switch contact 102 will open stopping the motor 88. In tap position 8 switch contact 100 is also open. Therefore, the regulator motor circuit cannot operate to raise the tap position until pole 84 of switch 82 is closed. This will only occur when the regulator has cooled below the preset temperature of 105°C.

Figure 6:
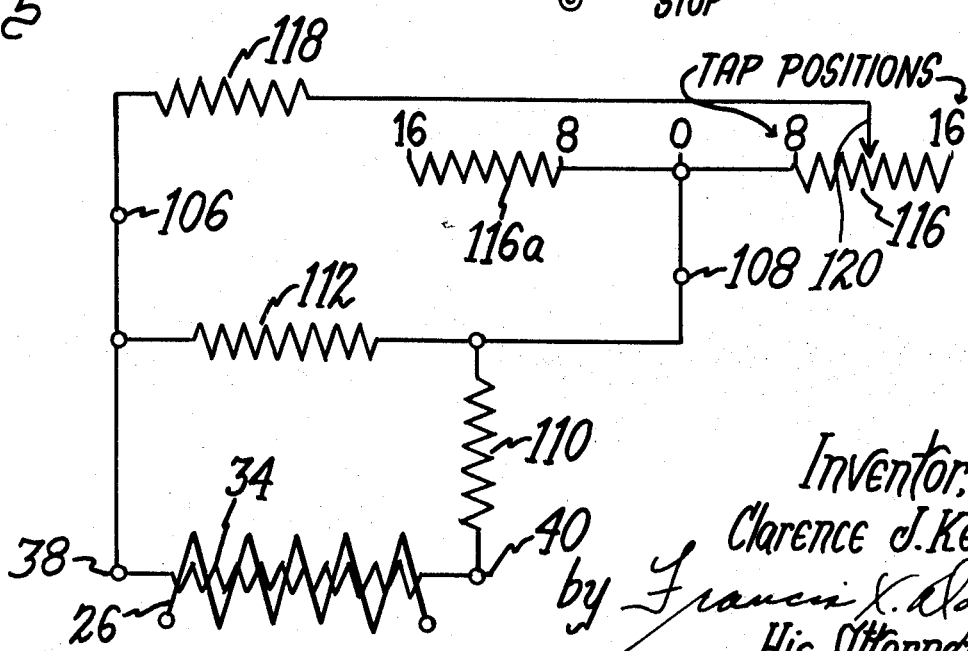
FIG. 6 is a schematic diagram of a preferred resistance circuit allowing greater current at lower settings of the electrical apparatus.

In order to take advantage of the higher current capacity of the regulator at lower tap positions, a novel resistance switch is provided in parallel with the heater resistor 34 in the thermal model 12. This switch is best shown in FIG. 6. As there shown, heater resistor 34 is connected to the terminals 106, 108 of the current transformer of the regulator (not shown). Padding resistors 110, 112 are shown in series and parallel with heater resistor 34, and are used to accommodate the heater resistor 34 to the various types of coil design to allow the thermal model to be identical for all units. Normally the current transformer of a regulator is designed for 0.2 amps at full load. The heater resistor 34 and padding resistors 110 and 112 are designed to provide a fixed value, 100 ohms, and a current of 0.16 amps. Thus, at full load tap position 16, 0.04 amps. must flow in the shunt resistor 116 and 118. However, at position 8 and lower positions the current transformer may carry a current of 0.32 amps. without overheating the regulator. In order to provide this current 0.16 amps. are shunted by the resistor 118 which is in parallel with the heater resistor and has the same total value as the heater resistor 34 and padding resistors 110 and 112. To provide the variable resistance needed between position 8 and position 16 to maintain the current in heater resistor 34, the resistors 116 and 116a each have a total value of 300 ohms. The slider 120 is actuated by the tap position switch to move along resistor 116 or 116a to increase the shunt resistance the proper increment according to the tap position. Thus it will be clear that by means of the slider resistance the regulator is able to be operated at a higher current at the lower tap positions without increasing the thermal indication of the thermal indicator.

From the above description, it is apparent that there has been shown and described a thermal load indicator which provides all of the objects and advantages hereinbefore set forth. It will, of course, be apparent to those skilled in the art that various changes may be made in the various constructional details of the numerous elements making up the thermal indicator without departing from the spirit and scope of this invention.

What is claimed as new and which it is desired to secure by Letters Patent of the United States is:

1. A thermal load indicator for electrical apparatus comprising, in combination,
   a. a thermal model including a nonlinear, temperature sensitive resistor and a heater resistor in a thermal container,
      1. said thermal model immersed in the insulating liquid of the electrical apparatus,
      2. said heater resistor thermally coupled to said nonlinear resistor and connected electrically to the current flow in the electrical apparatus,
   b. a voltage divider network comprising said nonlinear resistor and a rheostat,
      1. a junction in said voltage divider between said nonlinear resistor and said rheostat,
   c. a voltage source connected across said voltage divider,
   d. a servomotor connected to said junction,
      1. said servomotor mechanically coupled to said rheostat whereby a change in resistance in said nonlinear resistor provides a signal to said junction to actuate said servomotor to move said rheostat to eliminate said signal, and
   e. an indicator mechanically coupled to said rheostat to provide an indication of thermal load when said rheostat is moved by said servomotor.

2. A thermal load indicator as claimed in claim 1 in which said thermal model includes a first thermal barrier within said container about said nonlinear resistor providing a first thermal time constant and a second thermal barrier about said heater resistor providing a second thermal time constant relatively short when compared to said first thermal time constant.

3. A thermal load indicator as claimed in claim 2 in which said nonlinear resistor is wound on a winding form and in which said heater resistor is mounted within said winding form.

4. A thermal load indicator as claimed in claim 1 in which said servomotor includes a servomotor driving circuit comprising a transistor connected to said junction, a silicon controlled rectifier having a gate electrically connected to said transistor and a pair of motor relays connected in circuit with said rectifier, whereby said rectifier conducts on a half cycle according to said signal to said transistor, to actuate one of said motor relays according to said half cycle.

5. A thermal load indicator as claimed in claim 1 in which said indicator includes a switching means actuated by a predetermined thermal load indication to energize an electrical motor in the electrical apparatus to run a tap switch to a lower predetermined tap setting.

6. A thermal load indicator as set forth in claim 1 in which a resistor network is provided in parallel circuit with said heater resistor, said resistor network including a fixed resistor and a variable resistor, a slider connected to said variable resistor, said slider actuated by the tap changer of said voltage regulator to include portions of said variable resistor in circuit according to the position of said tap changer.

7. A voltage regulator having a thermal load indicator comprising a thermal model of said regulator connected in a voltage divider network with a rheostat, said rheostat actuated to balance said voltage divider network to compensate for changes in said thermal model, a pointer on said indicator moved to an indication of thermal load with said rheostat, a switch member in said indicator, said switch member moved from an open to closed position when said pointer reaches a predetermined thermal indication, said switch member electrically connected to the lower control circuit of the regulator motor to actuate said lower control circuit to run back the tap changer of said regulator when said predetermined thermal load is reached.

8. A voltage regulator having a thermal load indicator as set forth in claim 7 in which a switch contact is provided between said switch member and said lower control circuit, and a switch actuator connected to said tap changer, said switch actuator closing said switch contact at high positions of said tap changer and opening said switch contact at lower positions of said tap changer.

UNITED STATES PATENT OFFICE
CERTIFICATE OF CORRECTION

Patent No. 3,601,689                    Dated August 24, 1971

Inventor(s) Clarence J. Kettler

It is certified that error appears in the above-identified patent and that said Letters Patent are hereby corrected as shown below:

Column 3, line 22        After "nonlinear" delete - temperature sensor -

Column 3, line 75        After "circuit" (first occurrence) delete-(not the motor circuit -

Signed and sealed this 14th day of March 1972.

(SEAL)
Attest:

EDWARD M. FLETCHER, JR.　　　　　　ROBERT GOTTSCHALK
Attesting Officer　　　　　　　　　　Commissioner of Patents